Oct. 30, 1951  C. F. HAMMANN  2,573,566
METERING VALVE FOR FILLER MACHINES
Original Filed Oct. 20, 1943  6 Sheets-Sheet 5
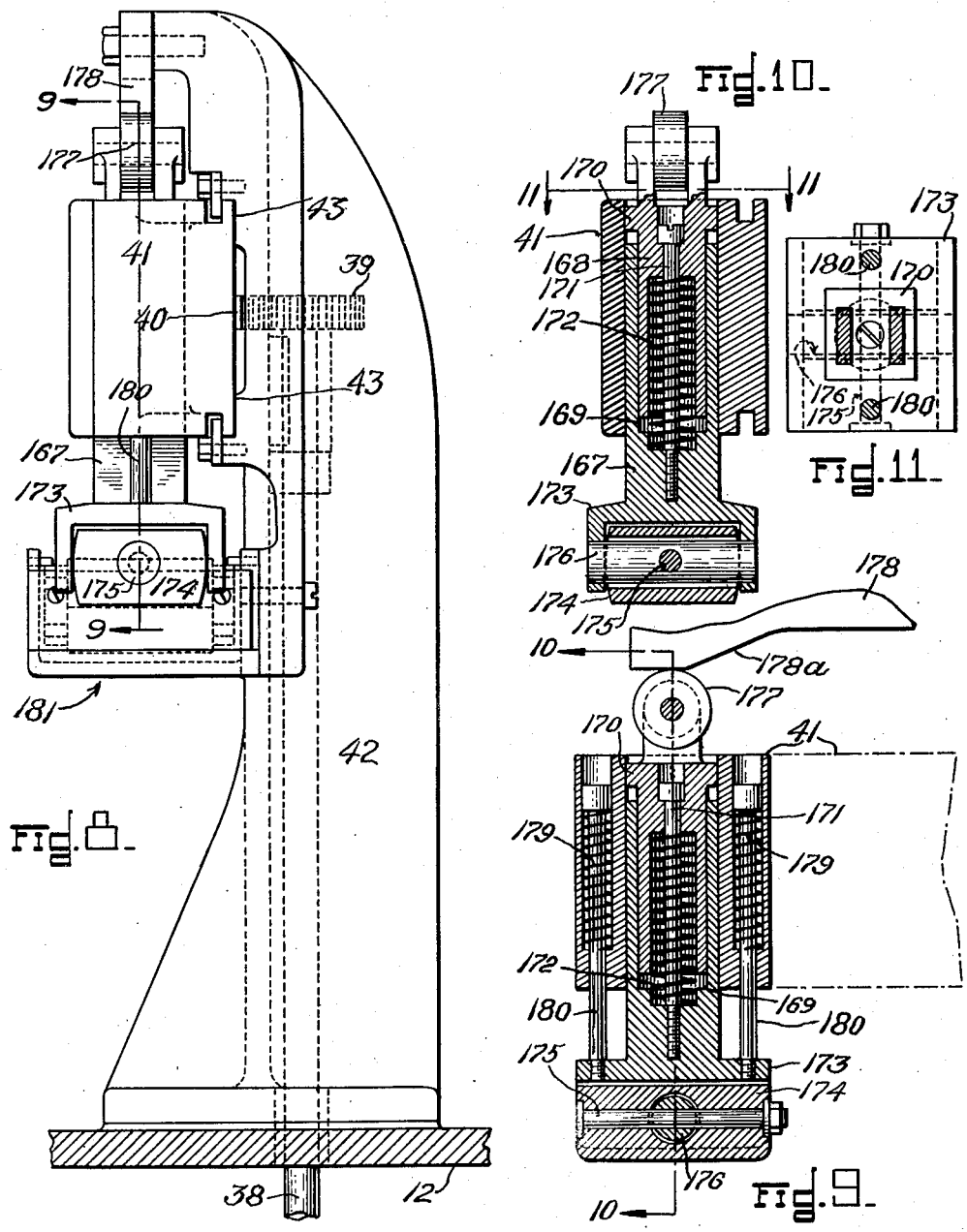
INVENTOR.
Carl F. Hammann
BY MC Metcalf Oct. 30, 1951     C. F. HAMMANN     2,573,566
METERING VALVE FOR FILLER MACHINES
Original Filed Oct. 20, 1943     6 Sheets-Sheet 6
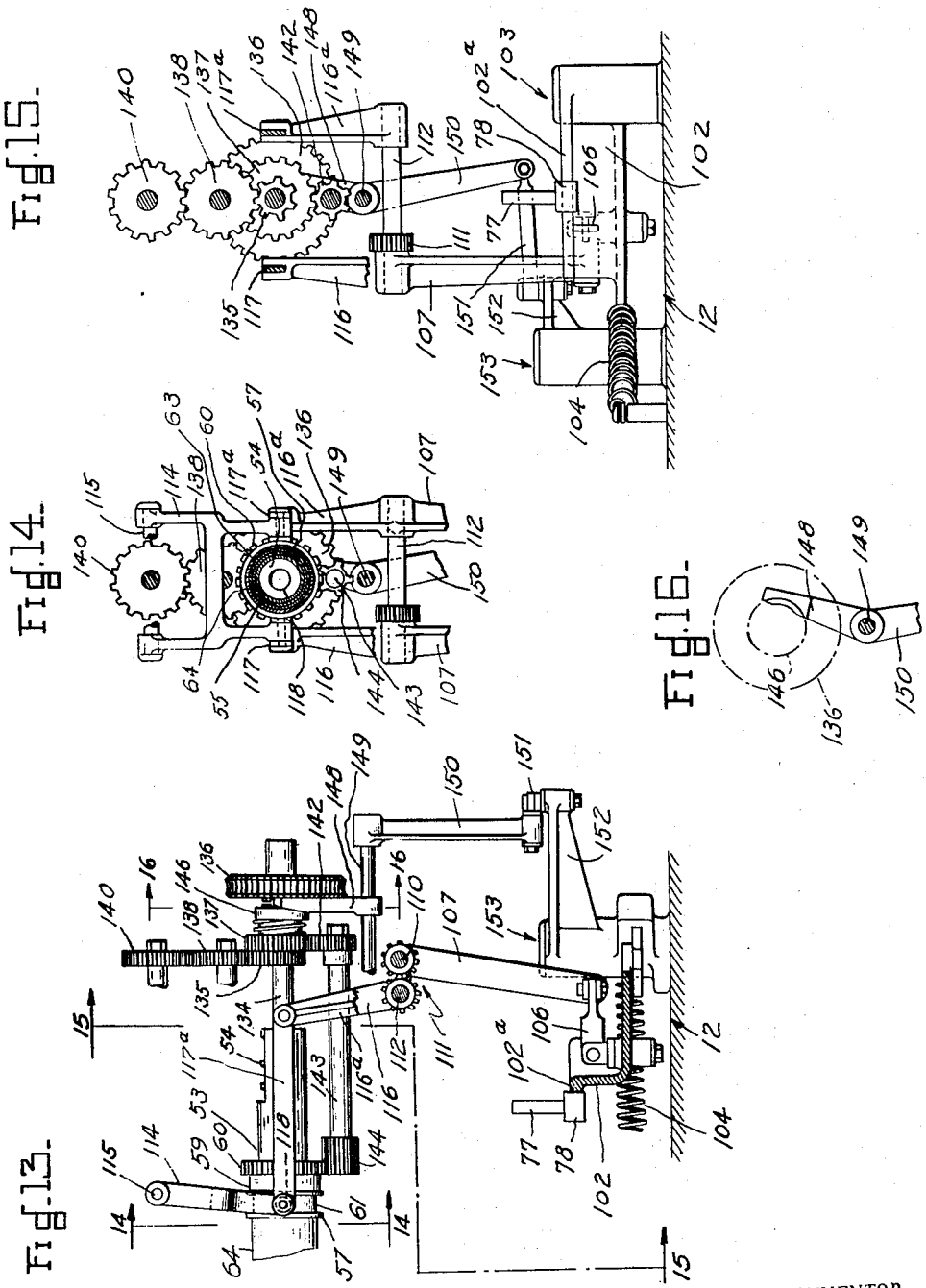
INVENTOR.
Carl F. Hammann
BY Patented Oct. 30, 1951

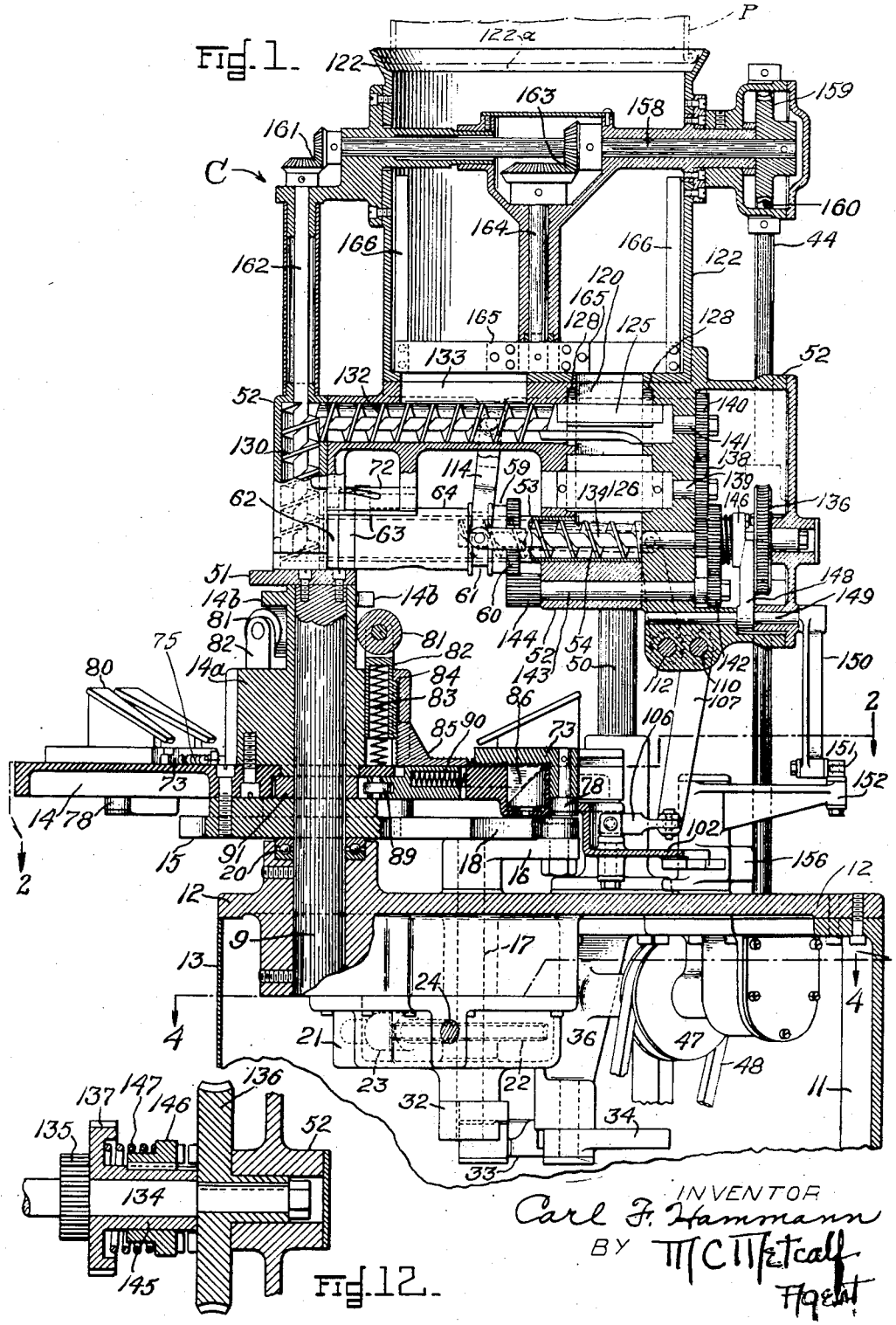

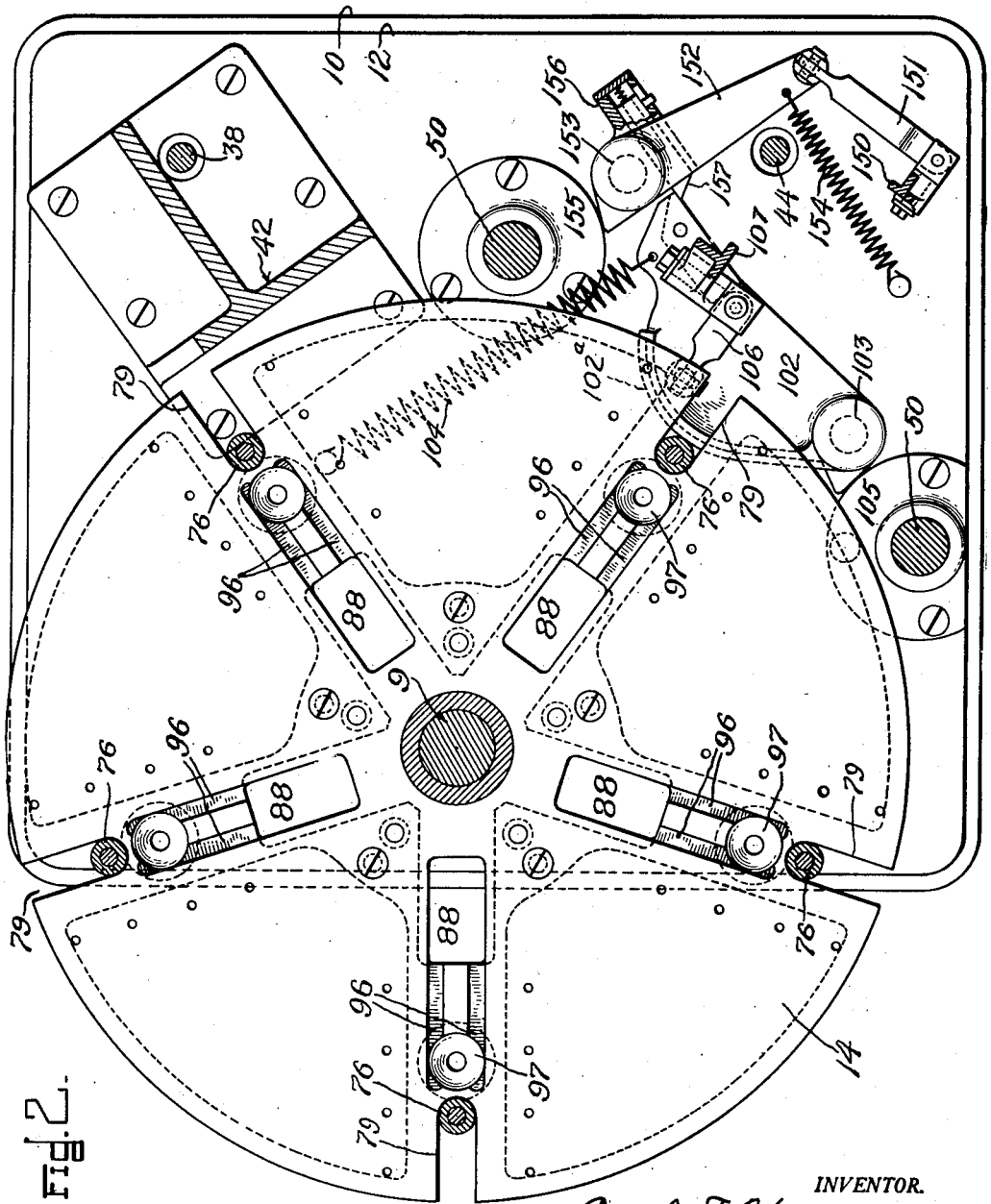

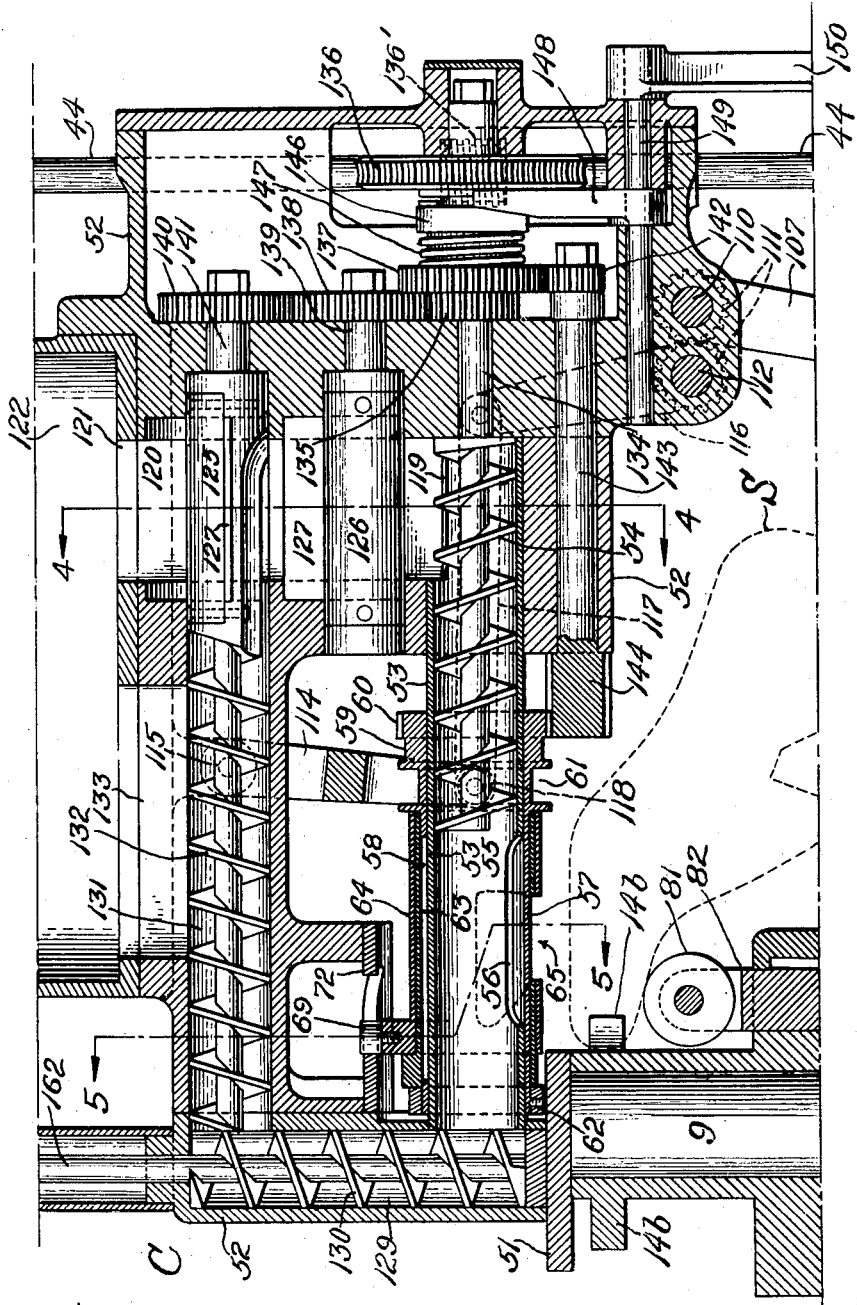

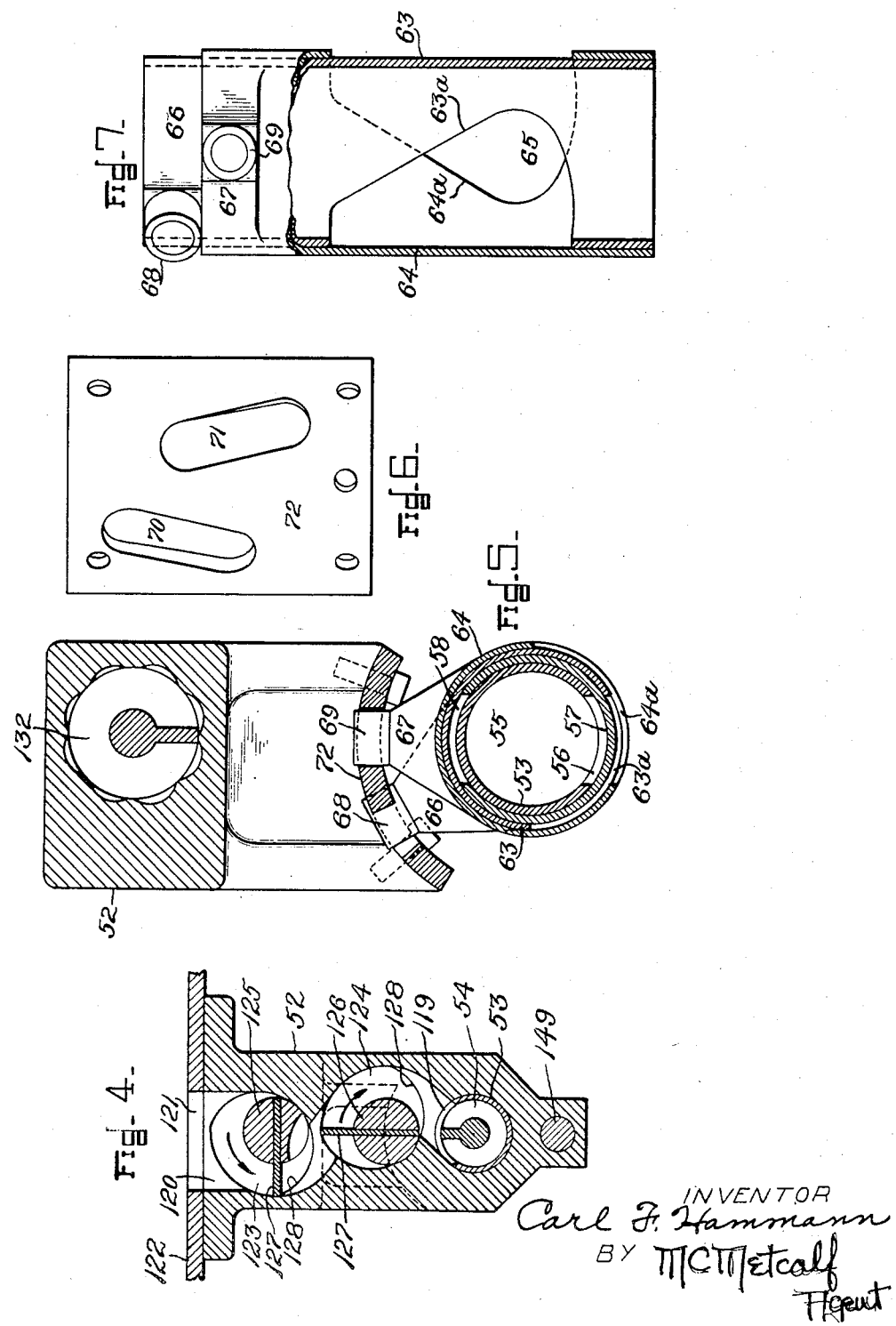

2,573,566

UNITED STATES PATENT OFFICE 2,573,566

METERING VALVE FOR FILLER MACHINES

Carl F. Hammann, Boston, Mass., assignor to North American Research Corporation, Cambridge, Mass., a corporation of Massachusetts Original application October 20, 1943, Serial No. 506,931. Divided and this application July 19, 1947, Serial No. 762,135

6 Claims. (Cl. 222—413)

1

This invention relates to apparatus for applying plastic material to articles, and, more particularly, to machines for applying filler material to the bottoms of shoes.

The present application is a division of the inventor's copending application, Serial No. 506,931, filed October 20, 1943, now issued as Patent No. 2,452,565, dated November 2, 1948. For subject matter shown and described but not claimed in the present and parent application, reference is made to other copending divisional applications, Serial No. 762,136, filed July 19, 1947, and Serial No. 762,137, filed July 19, 1947, now issued as Patent numbers 2,485,595 and 2,485,596, respectively, both dated October 25, 1949.

It is the general object of the invention to provide a mechanism for applying to articles of varying size, such as shoes, a metered amount of plastic material according to the size of each individual article. The mechanism consists in general of a container for holding a supply of filler material, an adjustable metering valve, and means for delivering the filler material to the valve and depositing the metered amount on the shoe.

The description refers to drawings in which:

Fig. 1 is a partial cross-section of an automatic filler machine employing the invention;

Fig. 2 is a section on line 2—2 of Fig. 1 with parts of the shoe-supporting jack mechanism removed;

Fig. 3 is an enlarged vertical sectional view of parts of the filler material feeding and delivering mechanism shown in Fig. 1;

Fig. 4 is a section through the feeding mechanism, on line 4—4 of Fig. 3;

Fig. 5 is a section through the delivering mechanism, on line 5—5 of Fig. 3;

Fig. 6 is a detail of the fixed valve-adjusting cam forming part of the delivery controlling valve mechanisms shown in Figs. 1 and 7;

Fig. 7 is a plan view, partly in section, of the delivery valve;

Fig. 8 is an end elevation of part of the mechanism which spreads, irons and distributes the filler material deposited upon a shoe by the mechanism shown in Fig. 3;

Fig. 9 is a section, through the slide of the filler distributing mechanism, on line 9—9 of Fig. 8;

Fig. 10 is a similar section, normal to that of Fig. 9, on line 10—10 of Fig. 9;

Fig. 11 is a horizontal section, through the upper part of the distributing mechanism, on line 11—11 of Fig. 10;

2

Fig. 12 is a vertical section through the feeding clutch mechanism shown in Fig. 3;

Fig. 13 is a detail view of the linkage between shoe jack and filler mechanisms as shown in Fig. 2, with the frame omitted;

Fig. 14 is a section on line 14—14 of Fig. 13;

Fig. 15 is a section on line 15—15 of Fig. 13; and

Fig. 16 is a section on line 16—16 of Fig. 13.

The invention is illustrated in Figs. 1 and 3 as applied to an automatic shoe filler machine of the type described in detail in Patent No. 2,452,565 referred to above. Such a machine consists in general of a circular table carrying a number of radially disposed shoe jacks on which lasted shoes may be placed. The table is rotated by a Geneva motion so as to advance the shoe jacks, with the lasted shoes, one at a time to the station at which the filler depositing mechanism, which is the invention herein described in detail is located. The driving mechanism of the table, also through suitable linkage controls the operation of the filler depositing mechanism and causes the metered amount of filler material to be deposited at the time when a shoe is in the proper position. The jacks are individually adjustable to the size of the shoe placed thereon and a suitable linkage is provided for adjusting the filler metering valve according to the size adjustment of the jack while advancing into position under the filler depositing mechanism.

Referring in more detail to the drawings, the driving and operating mechanism of such a machine are illustrated in Fig. 1 as mounted on a housing having a top wall 12 and side walls 13 supported by a base and corner posts (not shown).

Rigidly fixed at its lower end to the top wall 12 by means of set screws (Fig. 1) is an upstanding pivot post 9 on which is rotatably mounted a turret head 14 driven by a Geneva motion mechanism mounted underneath top wall 12. In the machine described in Patent No. 2,452,565, dated November 2, 1948, five step movements are imparted to the turret head by the Geneva motion to effect one complete revolution thereof.

Five jack mechanisms exemplified by jack 80, are mounted in equally spaced positions around the top circumference of turret head 14.

The hub 14a of the turret head, including the slotted wheel 15, rests upon and is supported by a ball bearing 20 mounted within a recess provided in top wall 12.

The vertical shaft 17, which carries the turret-actuating arm 16, is journaled in two bearings, one of which is provided on top wall 12 and the other on a gear housing 21 secured to the bottom side of the top wall. Within this housing, and fixed on shaft 17, is a worm gear 22 that is driven by a worm 23 fast on a horizontal shaft 24 journaled at its one end in a bearing on housing 21 and at its opposite end in a bearing provided upon the bottom side of top wall 12.

While the machine is in use shaft 24 is continuously driven by any suitable motor or source of power. Shaft 17, which is thus continuously driven, carries on its upper end a crank arm 16 which imparts the Geneva motion to turret head 14 through a slotted wheel 15.

The mechanism by which a metered quantity of filler material is deposited upon the forepart of each shoe is indicated generally at C in Fig. 1 and includes a continuously rotating vertical shaft 44 journalled near its lower end in a bearing provided upon the under side of top wall 12, and near its upper end in a bearing provided upon the framework of said mechanism C. At its lower end shaft 44 is connected through a suitable gear train (not shown) to the same motor or driving mechanism as shaft 17 and is thus continually driven when the machine is in operation.

The frame 52 of the filler depositing mechanism C is supported in part by the pivot post 9 and in part by two posts 50, 50 projecting upwardly from the top plate 12 of the base. Rigidly fastened in position upon the top of pivot post 9 is a gauge plate 51, on which the front portion of the frame 52 of the filler depositing mechanism rests, and to which it is fastened by screws as shown in Fig. 1.

The frame 52 of the filler depositing mechanism includes, as a rigid part thereof, a horizontal tubular portion or element 53 (Figs. 3, 4, and 5) whose interior provides a cylindrical chamber, one end of which is occupied by a feed screw 54, while the opposite end portion provides a delivery chamber 55 which is normally filled with plastic filler material under pressure created by the screw which is continuously rotated as described later. At the bottom of the delivery chamber 55 the fixed tubular frame element 53 has a longitudinal outlet slot 56 which is normally maintained closed by a valve sleeve 57 made at its top with a delivery port in the shape of a longitudinal slot 58. This valve sleeve is normally stationary but is mounted on the tubular frame element 53 for rotary and also axial movement thereon.

At its one end valve sleeve 57 has a head 59 (Figs. 1 and 3) formed with a gear 60 and with a circumferential groove 61. Fixed in position upon the opposite end of said valve sleeve is a collar 62 between which and head 59 are arranged two ported gate sleeves 63 and 64 rotatably mounted one within the other (Figs. 3, 5 and 7). Sleeves 63 and 64 have opposed ports 63a and 64a, respectively, which overlap and jointly define a variable outlet or delivery passage 65 (Fig. 7) that is permanently disposed directly beneath the outlet 56 of chamber 55. It will be clear that by rotatively adjusting the metering sleeves 63 and 64 in opposite directions, the size and capacity of the delivery passage 65 will be increased or diminished. It will also be clear that if the cutting delivery valve sleeve 57 is rotated one revolution, its port 58 will pass between outlet 56 of member 55 and the composite delivery passage 65 of valve sleeves 63 and 64, with the result that filler material is delivered through passage 65 in an amount proportionate to the size of passage 65.

At the conclusion of each step movement of turret head 14 a lasted shoe is brought into position under the filler depositing mechanism and the forepart of the shoe dwells for a period of time directly beneath the composite outlet passage 65, as indicated by dotted lines in Fig. 3. During the following period of rest of turret 14, the valve sleeve 57 is automatically slid axially on the tubular frame element 53 toward the right (Fig. 3) for a purpose that will presently appear, whereupon one complete revolution is imparted to it which carries its port 58 (Figs. 3 and 5) past and between the vertically aligned outlets 56 and 65. As the port 58 passes between these outlets a predetermined quantity of the plastic filler material is discharged under pressure from the chamber 55 on to the forepart of the shoe.

Adjacent to the collar 62 (Fig. 3) the sleeves 63 and 64 carry radial arms 66 and 67, respectively (Fig. 5) provided at their outer ends with cam rolls 68 and 69, respectively. These cam rolls engage relatively oblique cam slots 70 and 71 (Fig. 6) formed in an arcuate cam plate 72 fixed on the frame 52 of the filler depositing mechanism. When valve sleeve 57 is axially moved as above described, it carries the two sleeves 63 and 64 with it, thereby moving the cam rolls 68 and 69 lengthwise of the stationary cam slots 70 and 71, with the result that the two sleeves are rotatively adjusted relatively to each other in opposite directions, thereby enlarging the outlet 65 (Fig. 7) to a degree proportionate to the extent of such axial movement. As will appear later, the extent of this axial movement is proportionate to the length size of the lasted shoe.

As a shoe is brought into the position indicated by dotted lines in Fig. 3, the delivery passage 65 (Fig. 7) is adjusted to a size appropriate to the size of the shoe, and when the shoe is moved away from this position after the delivery of filler material has been effected, the three sleeves are automatically returned into normal positions, sleeves 63 and 64 being rotated in the opposite sense thereby restoring the delivery passage to its normal minimum size shown in Fig. 7. A mechanism for automatically shifting the three sleeves 57, 63 and 64 axially on the tubular frame element 53 in the manner just set forth will presently be described.

Adjacent to the filler depositing mechanism (Figs. 1 and 2) there is provided the member 102. This member has the form of a lever that is pivotally mounted at 103 upon the top wall 12 of the base of the machine, and normally held by a spring 104 against a stop 105 which may be the flange at the lower end of one of the posts 50. The jack mechanisms, which are more fully described in Patent No. 2,485,596, dated October 25, 1949, carry cam rolls 78 which are pushed outward when a lasted shoe is placed in the jack, the outward displacement of the roll being proportionate to the size of the shoe. While occupying its normal position, the cam face 102a of lever 102 is just outside the path of the cam rolls 78 of the jack mechanisms as the latter move past this lever while empty. When, however, a jack mechanism holding a lasted shoe moves past the lever 102, the cam roll 78 occupies an operative position farther away from the axis of the turret head, contacts face 102a, and swings cam lever 102 outwardly on its pivot 103 an angular distance that is proportionate to the size of the shoe on said jack mechanism.

Intermediate its ends the cam lever 102 is connected by a universal joint with one end of a link 106 whose opposite end is connected by another universal joint with the lower end of an arm 107 (Figs. 1, 2, 13 and 15) projecting downwardly from a horizontal rockshaft 110 journalled in a bearing provided upon the frame 52 of the filler depositing mechanism C. This rockshaft is connected by spur pinions 111 with a second horizontal rockshaft 112 also journalled in a bearing provided on frame 52. This second rockshaft has fixed to its opposite ends two upwardly extending arms 116, 116a whose upper ends are connected by a pair of links 117, 117a with the opposite legs or branches of a yoke 114 whose upper end is pivotally supported at 115 on frame 52. The legs or branches of yoke 114 are provided at their lower ends with rolls 118 occupying the groove 61 of the head 59 of sleeve valve 57.

It will thus be seen that when a loaded jack mechanism arrives at the filler depositing mechanisms the angular displacement of lever 102, due to the engagement therewith of roll 78 of the jack mechanism, acts through the linkage just described to adjust sleeve valve 57 and the two sleeves 63 and 64 axially relatively to the fixed cam plate 72, thereby enlarging the outlet passage 65 (Fig. 7) to a size that is appropriate for the size of the shoe carried by the jack mechanism.

The fixed tubular frame element 53 (Figs. 3 and 4) has adjacent to its one end and at its top an inlet port 119 in register with the lower end of a conduit 120 formed in frame 52, the upper end of this conduit being in register with an outlet 121 provided through the bottom wall of a hopper 122 adapted to hold a supply of plastic filler material. Intermediate its upper and lower ends this conduit has two enlargements or chambers 123 and 124 within which are arranged, respectively, rotatably supported paddle-carriers 125 and 126. Each of these carriers has a longitudinal transverse slot within which is loosely fitted a paddle blade 127 so that it is movable edgewise transversely or radially with respect to the axis of its carrier. Recesses 128 at opposite sides of chambers 123 and 124 provide cam surfaces engaging the opposite ends of the blades to move the same back and forth as the carriers are rotated in the directions of the arrows in Fig. 4.

The 90° arcuate portions of these recesses to which the reference numerals 128 are applied in Fig. 4 are the only portions of the recesses 123 and 124 which serve as blade-adjusting cams, and each of these cam portions acts upon its blade to reverse the position thereof during each half-revolution of the same.

While the paddles are continuously rotating, the filler material is delivered into the upper end of the conduit 120 and is forced downwardly through the latter by the paddles and delivered into the tubular frame element 53 through inlet 119 (Figs. 3 and 4). Upon its entrance into the tubular frame element 53, the filler material is forced lengthwise of the latter by the continuously rotating feed screw or worm 54 into the chamber 55. Filler material that is thus forced into chamber 55, except the portions thereof deposited upon the shoes, is discharged from tubular frame element 53 into a vertical cylindrical chamber 129 containing a continuously rotating feed screw 130 by which it is propelled to the upper end of that chamber where the latter is provided at one side thereof with an outlet through which the material is delivered into one end of a horizontal cylindrical chamber 131. Within the latter is arranged a continuously rotating feed screw which is an integral part of the blade-carrier 125 toward which the material is forced by the feed screw, some of the material being returned to hopper 122 through an inlet 133 and some passing alongside of said blade-carrier into conduit 120.

Feed screw 54 (Fig. 3) is at one end connected to a shaft 134 journalled in a bearing on frame 52, and on this shaft are fixed a pinion 135 and a worm gear 136 between which is provided a spur gear 137 that is loosely mounted on the shaft. Worm gear 136 is continuously driven by a worm 136' (Figs. 3 and 13) fast on the vertical shaft 44 hereinbefore referred to. The pinion 135 continuously drives a gear 138 fast on a shaft 139 projecting from one end of blade carrier 126, and gear 138 continuously drives a gear 140 fast on a shaft 141 projecting from one end of blade carrier 125.

The loose gear 137 (Figs. 3 and 13) is normally at rest and meshes with a pinion 142 fast on one end of a horizontal shaft 143 journalled in a bearing on frame 52 and carrying at its opposite end an elongate pinion 144 meshing with the gear 60 of the rotary sleeve valve 57. It will be clear that gear 60 always remains in mesh with the elongate pinion 144, however the sleeve valve 57 is adjusted axially by the yoke 114.

As shown in Fig. 12 the normally loose and stationary gear 137 has an elongate hub 145 on which is loosely splined a clutch member 146 having, at its outer end, lugs cooperating with corresponding clutch lugs provided upon the inner face of worm gear 136 toward which said clutch member is yieldingly urged by a coiled spring 147 surrounding the same.

Normally the clutch member 146 is engaged by a cam detent arm 148 (Figs. 1, 3, 13 and 16) by which it is held away from, and out of mesh with, the clutch face of worm gear 136 so that gear 137, shaft 143 and the sleeve valve 57 are normally at rest. The detent arm 148 is fast on a horizontal rockshaft 149 journalled in bearings on frame 52 and to the outer end of which is fixed a depending arm 150. As shown in Figs. 1, 2, 13 and 15, the lower end of this depending arm is connected by a universal joint with one end of a link 151 whose opposite end is connected by a universal joint with the free end of a lever 152 that is pivotally mounted at 153 upon the top wall 12 of the base of the machine. A spring 154 connected with lever 152 normally holds the latter at the limit of its movement in one direction against a stop 155, herein shown as the flange at the lower end of one of the posts 50, so that it acts through the connections described to maintain the detent arm 148 (Figs. 1, 3, 13 and 16) in a position at the limit of its movement toward shaft 134, where it holds clutch member 146 out of engagement with the rotating gear 136.

The hub of lever 152 has a tangentially disposed socket 156 (Figs. 1 and 2) within which is slidably mounted a spring pressed abutment member or latch abutment 157, whereof one end is beveled and projects beyond socket 156 to cooperate with the free end of the cam lever 102 hereinbefore referred to. The outer exposed end of abutment latch 157 is provided with a flat side surface normally occupying a position in the path of the free end of lever 102 so that when the latter is swung on its pivot by one of the rolls 78 of a last jack mechanism, the free end of said lever 102 moves past abutment 157 and in passing swings lever 152 which, through the connections described, momentarily lifts detent 148 (Figs. 1, 3 and 16) from its normal position between clutch members 146 and 136. This movement of the detent permits spring 147 (Fig. 12) to shift clutch member 146 into clutching engagement with worm gear 136, which acts through said clutch member to impart a single revolution to gear 137 and sleeve valve 57, whereupon clutch member 146 is again cammed out of engagement with the worm gear and stopped by detent 148. Thus detent 148, clutch member 146 and spring 147 are parts of a one-revolution-and-stop mechanism that is controlled and operated by the cam lever 102 to bring about a single revolution of sleeve valve 57 immediately upon arrival of a loaded jack mechanism in position beneath the filler depositing mechanism C. It will be noted that when the loaded jack mechanism departs from this position, the spring 104 (Fig. 2) restores lever 102 to its normal position, the nose at the free end of said lever wiping idly across the outer beveled end of latch abutment 157 as said lever is thus returned.

Near its upper end the cylindrical hopper 122 is provided at opposite sides with bearings supporting a horizontal transverse shaft 158, on one end of which is fixed a worm gear 159 that is continuously driven by a worm 160 fast on the upper end of the vertical shaft 44. At its opposite end the shaft 158 is connected by miter gears 161 with the upper end of a vertical shaft that is an integral part of the feed screw 130 referred to above. Thus all of the material-feeding screws, as well as the paddles 127 (Fig. 3), are in motion while the machine is operating.

Near its middle the horizontal shaft 158 is connected by bevel gears 163 with the upper end of a vertical shaft 164 rotatably supported within a fixed bearing provided at the center of the hopper, and to the lower end of this shaft are fixed approximately radial arms 165 each of which is provided at its outer end with an upright scraper blade 166 disposed close to and parallel with the cylindrical wall of the hopper. Shaft 164, arms 165 and blades 166 constitute a continuously rotating agitator which dislodges the filler material from the hopper wall and also sweeps said material toward and into the upper end of conduit 120.

The hopper can be conveniently loaded with filler material by placing a cylindrical container P with the viscous material in inverted position upon the conical section 122a of the hopper (Fig. 1). The material will then flow into the hopper while the entire mass is fairly well sealed from the atmosphere, which is often desirable.

After a predetermined quantity of filler material has been delivered on to the shoe at station C (Fig. 1) the next step movement of the turret head may bring the shoe into position under a spreading mechanism, for example, a mechanism of the type described in Patent No. 2,485,595, dated October 25, 1949, which evenly distributes the deposited filler material within the forepart cavity of the shoe. This mechanism, as illustrated in Figs. 8, 9, 10 and 11, is supported by an upstanding bracket 42 mounted on top wall 12 at station D (Fig. 1). A slide 41 is mounted on bracket 42 so as to slide radially toward or away from the center of the turret head, and carries vertical inner ways in which is mounted a second slide consisting of two telescoping sections 167 and 168. The upper end of lower section 167 forms a rectangular shank which is slidably fitted in the vertical ways of slide 41. In the upper part of the shank is a cylindrical bore 169. The lower part of section 168 is tubular, and is slidably fitted within bore 169. Section 168 terminates at its upper end in a rectangular flange 170 which is slidably fitted in the vertical ways of slide 41. The upper end of section 168 is counterbored and provided with a bolt 171 which extends through the tubular part of section 168 and is secured in a tapped hole in section 167. The lower part of section 168 is also counterbored to provide a seat for a coil spring 172 which is assembled under initial compression so as to maintain the compound slide, consisting of sections 167 and 168, extended as shown in Figs. 9 and 10 when the pressing mechanism is idle.

Section 167 has a yoke 173 in which is journalled a pintle 176. A second pintle 175 is journalled in pintle 176. A shoe pressing pad 174 is mounted on pintle 175, which runs through pintle 176, and is bored to allow clearance for pintle 176. This mounting provides for independent rocking movement of the pad 174 about two horizontal axes.

The upper end of section 168 carries a cam roll 177. Bolted to bracket 42 is a radially disposed cam rail 178 having an incline 178a near its inner end. Slide 41 is bored to accommodate a pair of bolts 180 and coil springs 179. The bolts are secured in tapped holes in yoke 173. The springs 179 serve to hold cam roller 77 in yielding engagement with the cam rail.

When a shoe holding the metered quantity of filler is brought into position under the pressing device the slide 41 is reciprocated once radially by a suitable mechanism (not shown). As the slide nears the inner limit of its travel at a point corresponding to the position of the forepart of the shoe, cam roller 177 is forced down the incline 178a. Spring 172 is much stiffer than springs 179, and serves to hold the compound slide 167—168 fully extended as the cam roller 177 travels down incline 178a prior to the engagement of pad 174 with the shoe. The mechanism is so arranged that pad 174 comes in contact with the shoe shortly before roller 177 reaches the lower end of slope 177. Spring 172 is thereafter compressed. Each reciprocation of slide 44 causes roller 177 to move down slope 178a, travel horizontally for some distance toward the axis of the turret head, and then return to the idle position. During each such reciprocation pressing pad 174 is brought into contact with the forepart of the shoe which is in place under the pressing mechanism, reciprocated back and forth under pressure across the forepart, and returned to the idle position where the pad comes into contact with a lubricating device generally indicated by the numeral 181 (Fig. 8). This motion of the pad serves to distribute and smooth the filler material which has been previously deposited on the forepart of the shoe by the filler metering mechanism.

It should be understood that the present disclosure is for the purpose of illustration only and that this invention includes all modifications and equivalents which fall within the scope of the appended claims.

What is claimed is:

1. In a machine of the class described, a filler delivering mechanism comprising a hopper for holding a supply of plastic filler material; a horizontal tubular delivery conduit leading into an outlet; means for transmitting filler material from said hopper under pressure into said tubular conduit; a normally closed valve sleeve for controlling said outlet rotatably mounted and axially movable, upon said tubular delivery conduit, and having a longitudinal slot; a pair of gate sleeves rotatably supported by, and movable axially with, said valve sleeve, said gate sleeves being disposed one within the other and having overlapping cut-outs which provide a second outlet permanently in register with said first outlet and variable as to size by relative angular adjustment of said gate sleeves in opposite directions; means for independently rotating said valve sleeve to pass its slot between said two outlets thereby to effect delivery of filler material; means operable to shift said three sleeves axially on said tubular conduit; and fixed cam means for adjusting said gate sleeves angularly in opposite directions, thereby regulating the size of said second outlet when said gate sleeves are shifted axially.

2. In a machine of the type described, a plastic material delivering mechanism comprising: a material container; a delivery chamber having a discharge port; means for transmitting said material from said container into said chamber; a slide normally closing said port; a pair of gate sleeves superimposed movably relative to each other on said slide and said port and together defining a metering opening of variable area; means for operating said slide to open and to close said port, and adjusting means for moving said gate sleeves, thereby setting a discharge opening of predeterminable area.

3. Mechanism according to claim 2 wherein said chamber, said slide and said sleeves comprise coaxially mounted cylindrical tubes incorporating said port and said opening as cut-outs.

4. Mechanism according to claim 3 having means for axially moving said sleeves, thereby varying said area of said discharge opening.

5. In a machine of the type described, a plastic filler delivering mechanism comprising a filler container, a delivery chamber having a discharge port; means for transmitting filler under pressure from said container into said chamber, a cutting slide normally closing said port; a pair of gate sleeves superimposed movably relative to each other on said slide and said port and together defining a metering opening of variable area; means for operating said slide to open and to close said port, and adjusting means for moving said gate sleeves, thereby setting a discharge opening of predeterminable area.

6. In a machine of the type described, a plastic material delivering mechanism comprising: a material container; a tubular delivery chamber having a discharge port; means for transmitting said material from said container into said chamber; a tubular slide mounted coaxially with respect to said chamber, having an opening suitably located for alignment with said port; a pair of tubular gate sleeves coaxially mounted with respect to said slide and having cut-outs which together define a metering opening of variable area; adjusting means for moving said gate sleeves, thereby setting a discharge opening of predeterminable area; and means for rotating said slide so as to bring the opening therein into, and out of alignment with said port, thereby opening and closing said port.

CARL F. HAMMANN.

REFERENCES CITED

The following references are of record in the file of this patent:

UNITED STATES PATENTS

| Number | Name | Date |
| --- | --- | --- |
| 1,151,751 | Barenz | Aug. 31, 1915 |
| 1,365,781 | Hartnett | Jan. 18, 1921 |